United States Patent
Alahyari et al.

(10) Patent No.: US 12,126,243 B2
(45) Date of Patent: Oct. 22, 2024

(54) HEAT TRANSFER SYSTEMS FOR SUPERCONDUCTORS

(71) Applicant: RAYTHEON TECHNOLOGIES CORPORATION, Farmington, CT (US)

(72) Inventors: Abbas A. Alahyari, Glastonbury, CT (US); Parag M. Kshirsagar, South Windsor, CT (US)

(73) Assignee: RTX CORPORATION, Farmington, CT (US)

(*) Notice: Subject to any disclaimer, the term of this patent is extended or adjusted under 35 U.S.C. 154(b) by 359 days.

(21) Appl. No.: 17/581,572

(22) Filed: Jan. 21, 2022

(65) Prior Publication Data
US 2023/0238871 A1 Jul. 27, 2023

(51) Int. Cl.
H02K 55/04 (2006.01)
H02K 9/20 (2006.01)

(52) U.S. Cl.
CPC ............... *H02K 55/04* (2013.01); *H02K 9/20* (2013.01)

(58) Field of Classification Search
CPC .................................. H02K 9/20; H02K 55/04
USPC ................................................. 310/52, 54, 64
See application file for complete search history.

(56) References Cited

U.S. PATENT DOCUMENTS

| | | | |
|---|---|---|---|
| 3,524,327 A | 8/1970 | Carbonell et al. | |
| 4,238,700 A | 12/1980 | Vinokurov et al. | |
| 6,625,992 B2 | 9/2003 | Maguire et al. | |
| 7,741,738 B2 | 6/2010 | Ries | |
| 2006/0189223 A1* | 8/2006 | Winn | H02K 9/20 440/6 |
| 2016/0020674 A1 | 1/2016 | Smaoui et al. | |
| 2018/0062484 A1* | 3/2018 | Martinez Fernandez | H02K 55/02 |
| 2023/0238871 A1* | 7/2023 | Alahyari | H02K 9/19 310/52 |
| 2023/0250754 A1* | 8/2023 | Muldoon | F02C 9/40 60/39.465 |
| 2023/0258126 A1* | 8/2023 | Terwilliger | F02C 1/005 60/39.182 |
| 2024/0060471 A1* | 2/2024 | Kim | H02K 55/04 |
| 2024/0077020 A1* | 3/2024 | Mochrie | F02C 7/14 |

FOREIGN PATENT DOCUMENTS

| | | |
|---|---|---|
| CN | 107804178 | 3/2018 |
| EP | 3078104 | 10/2016 |
| WO | 2017034707 | 3/2017 |

OTHER PUBLICATIONS

European Patent Office, European Search Report dated Sep. 12, 2023 in Application No. 22207586.3.
European Patent Office, European Partial Search Report dated Jun. 12, 2023 in Application No. 22207586.3.
Airgas, Safety Data Sheet, Jan. 21, 2021, p. 1-10, v. 4.

* cited by examiner

*Primary Examiner* — Rashad H. Johnson
(74) *Attorney, Agent, or Firm* — SNELL & WILMER L.L.P.

(57) ABSTRACT

A cooling system for a superconducting electric machine may comprise a fluid reservoir and a first fluid comprising a first mixture of hydrogen and helium configured to be stored in the fluid reservoir. A plurality of conduits may be fluidly coupled to the fluid reservoir and may form a closed loop between the fluid reservoir and the superconducting electric machine.

18 Claims, 6 Drawing Sheets

… (1) HEAT TRANSFER SYSTEMS FOR SUPERCONDUCTORS

GOVERNMENT LICENSE RIGHTS

This invention was made with Government support under Contract DE-AR0001404 awarded by the United States Department of Energy. The Government has certain rights in this invention.

FIELD

The present disclosure relates to heat transfer systems for superconductors, and, more specifically, to heat transfer systems employing a heat transfer fluid that is a mixture of helium and hydrogen.

BACKGROUND

Superconducting electric machines employ superconductors such as, for example, magnesium diboride, to generate rotation of the machine's rotors. Superconductors exhibit zero or near zero resistance at temperatures less than a superconducting transition temperature ($T_C$) of the superconductor. In this regard, superconductors benefit from being cooled at cryogenic temperatures (e.g., temperatures less than 40 Kelvin (K)).

SUMMARY

A cooling system for a superconducting electric machine is disclosed herein. In accordance with various embodiments, the cooling system comprises a fluid reservoir, a first fluid comprising a first mixture of hydrogen and helium configured to be stored in the fluid reservoir, and a plurality of conduits fluidly coupled to the fluid reservoir and forming a closed loop between the fluid reservoir and the superconducting electric machine.

In various embodiments, the first mixture of hydrogen and helium may comprise between about 2% and about 5% hydrogen and between about 98% and about 95% helium. In various embodiments, the first mixture of hydrogen and helium may comprise between about 0.5% and about 10% hydrogen and between about 99.5% and about 90% helium.

In various embodiments, the fluid reservoir may include a heat exchanger comprising a working fluid configured to remove a heat load from the first fluid. The working fluid may comprise a second mixture of hydrogen and helium, and the second mixture of hydrogen and helium may comprise between about 2% and about 5% hydrogen and between about 98% and about 95% helium.

In various embodiments, the fluid reservoir may comprise a cryogenic cooler. In various embodiments, the closed loop may be configured such that a first portion of the first fluid removes a first heat load from a stator winding and a second portion of the first fluid removes a second heat load from a rotor winding.

In various embodiments, at least one of the stator winding or the rotor winding may be formed of a superconducting material having a superconducting transition temperature between 0 Kelvin and 40 Kelvin. In various embodiments, the least one of the stator winding or the rotor winding may comprise magnesium diboride.

A superconducting electric machine is also disclosed herein. In accordance with various embodiments, the superconducting electric machine may comprise a rotor configured to rotate about a central longitudinal axis, and a stator configured to be non-rotating relative to the central longitudinal axis. A rotor winding is coiled about the rotor and comprises a first superconducting material A stator winding is coiled about the stator and comprises a second superconducting material. A cooling system is configured to thermally couple a first fluid to the stator winding and the rotor winding. The first fluid comprises a non-flammable mixture of hydrogen and helium.

In various embodiments, the non-flammable mixture of hydrogen and helium may comprise between about 2% and about 5% hydrogen and between about 98% and about 95% helium. In various embodiments, the cooling system may further comprise a fluid reservoir configured to house the non-flammable mixture of hydrogen and helium, and a plurality of conduits fluidly coupling to the fluid reservoir to the rotor and the stator.

In various embodiments, the fluid reservoir may include a heat exchanger comprising a working fluid configured to remove a heat load from the first fluid. The working fluid may comprise the non-flammable mixture of hydrogen and helium.

In various embodiments, the cooling system may be configured such that a first portion of the first fluid removes a first heat load from the stator winding and a second portion of the first fluid removes a second heat load from the rotor winding. In various embodiments, at least one of the stator winding or the rotor winding may be formed of a superconducting material having a superconducting transition temperature of 40 Kelvin or less.

An aircraft engine is also disclosed herein. In accordance with various embodiments, the aircraft engine may comprise a fan, an exit guide vane located at an outlet of the fan and an after-fan turbine located aft of the exit guide vane. An electrical generator is operably coupled to the after-fan turbine and configured to generate an electrical current in response to rotation of the after-fan turbine. An electric motor electrically is coupled to the electrical generator and rotationally coupled to the fan. The electric motor includes a superconductor. A cooling system is configured to thermally couple a supercooled fluid to the superconductor.

In various embodiments, the electric motor may comprise a rotor configured to rotate about a central longitudinal axis, a stator configured to be non-rotating relative to the central longitudinal axis, a rotor winding coiled about the rotor, and a stator winding coiled about the stator. At least one of the rotor winding or the stator winding may comprise the superconductor.

In various embodiments, the cooling system may be configured such that a first portion of the supercooled fluid removes a first heat load from the stator winding and a second portion of the supercooled fluid removes a second heat load from the rotor winding.

In various embodiments, a compressor section may be aft of the after-fan turbine. A combustor section may be configured to receive a compressed fluid from the compressor section. A turbine section may be aft of the combustor section. In various embodiments, a controller may be configured to control a current provided to the electric motor and a flow of fuel to the combustor section. The controller may be configured to determine whether to operate the aircraft engine as an electric engine or a gas combustion engine based on at least one of a rotations per minute of the after-fan turbine or a current output by the electrical generator. \

In various embodiments, the supercooled fluid may comprise between about 0.5% and about 10% hydrogen and between about 99.5% and about 90% helium.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option.

Throughout the present disclosure, like reference numbers denote like elements. Accordingly, elements with like element numbering may be shown in the figures but may not necessarily be repeated herein for the sake of brevity. Surface shading lines and/or cross-hatching may be used throughout the figures to denote different parts but not necessarily to denote the same or different materials.

As used herein, "aft" refers to the direction associated with the tail (e.g., the back end) of an aircraft, or generally, opposite to the direction of flight or motion.

Figure 1:
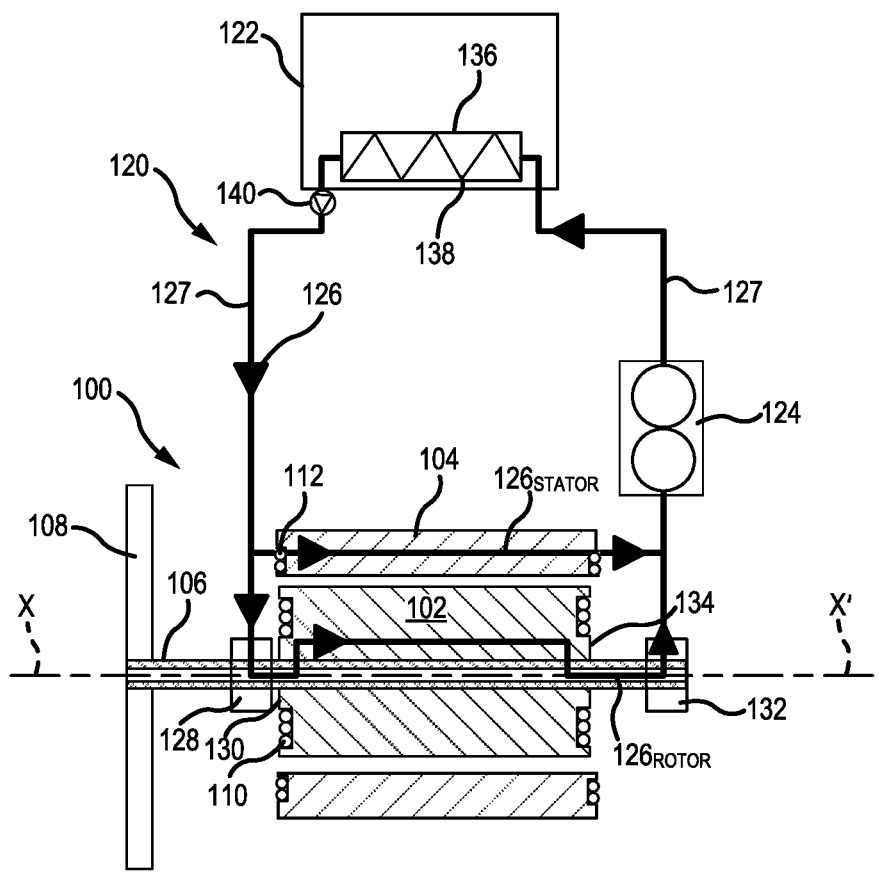
FIG. 1 illustrates an exemplary superconducting electric machine, in accordance with various embodiments.

With reference to FIG. 1, a superconducting electric machine 100 is provided, in accordance with various embodiments. In various embodiments, superconducting electric machine 100 is an electric motor. Superconducting electric machine 100 includes one or more rotor(s) 102 and one or more stator(s) 104. Rotor 102 is/are configured to rotation about a central longitudinal axis X-X' of machine 100. Stator(s) 104 is/are non-rotating structures. In this regard, stator(s) 104 does/do not rotate about central longitudinal axis X-X'. Rotor(s) 102 is/are rotationally coupled to a shaft 105 such that rotation of rotor(s) 102 drives rotation of shaft 106. In this regard, shaft 106 may convey the mechanical output of superconducting electric machine 100. In various embodiments, shaft 106 is rotationally coupled to a fan 108 of an aircraft engine.

Rotation of rotor(s) 102 is generated via electromagnetic force. For example, rotor(s) 102 may include rotor windings 110, stator(s) 104 may include stator windings 112, and rotation of rotor(s) 104 may be due, at least in part, to the interaction between rotor windings 110 and a magnetic field generated via the flow of current through stator windings 112.

In accordance with various embodiments, rotor windings 110 and stator winding 112 are each formed of a superconducting material. Superconductivity is a phenomenon in which a conductive material exhibits zero, or nearly zero, resistance to electric current. A superconducting material exhibits superconductivity when the temperature of the material is less than a critical temperature, or transition temperature ($T_c$), of the material. The superconducting transition temperature $T_c$ is specific to the type of material of the superconductor. In various embodiments, rotor windings 110 and/or stator winding 112 may be formed of a material having a superconducting transition temperature $T_c$ of 40 K or less (e.g. a material having a superconducting transition temperature $T_c$ of between 0 K and 40 K). In various embodiments, rotor windings 110 and/or stator winding 112 may be formed of a material having a superconducting transition temperature $T_c$ of 30 K or less (e.g. a material having a superconducting transition temperature $T_c$ of between 0 K and 30 K). In various embodiments, rotor windings 110 and/or stator windings 112 may be formed of magnesium diboride. In various embodiments, rotor windings 110 and stator windings 112 may be formed of the same superconducting material. In various embodiments, the superconducting material used to form rotor windings 110 may be different from the superconducting material used to form stator windings 112.

In accordance with various embodiments, machine 100 includes a cooling system 120. Cooling system 120 is configured to remove heat from rotor windings 110 and stator windings 112, such that the temperature of rotor windings 110 and the temperature of stator windings 112 remains less than the superconductive transition temperature(s) $T_c$ of rotor windings 110 and stator windings 112. For example, cooling system 120 may be configured such that the temperature of rotor windings 110 and the temperature of stator windings 112 is at least 5 K or, in various embodiments, at least 10 K less than the superconductive transition temperature(s) $T_c$ of rotor windings 110 and stator windings 112. In this regard, cooling system 120 may utilize cryogenic temperatures. For example, a fluid reservoir 122 of cooling system 120 may be set at a temperature of about 20 K. As used in the previous context only, the term "about" means±5 K. In various embodiments, fluid reservoir 122 may be set at a temperature of between 0 K and 40 K, between 10 K and 30K, or between 15 K and 25 K. In various embodiments, fluid reservoir 122 is cryogenic cooler.

Cooling system 120 includes one or more pump(s) 124 configured to pump a fluid 126 from fluid reservoir 122 to machine 100 (e.g., to rotor(s) 102 and/or stator(s) 104) and from machine 100 back to fluid reservoir 122. In this regard, cooling system 120 may comprise a closed loop. One or more conduits 127 fluidly connect fluid reservoir 122 and machine 100. In this regard, fluid 126 flows between machine 100 and fluid reservoir 122 via conduits 127. A first portion $126_{STATOR}$ of fluid 126 is provided to stator(s) 104 to cool/remove heat from stator windings 112. A second portion $126_{ROTOR}$ of fluid 126 is provided to rotor(s) 102 to cool/remove heat from rotor windings 110. Stated differently, first portion $126_{STATOR}$ of fluid 126 receives a heat load from stator windings 112 and second portion $126_{ROTOR}$ of fluid 126 receives a heat load from rotor windings 110. In various embodiments, a first fluid transfer coupling 128 may be located at a first axial end 130 of rotor 102. A second fluid transfer coupling 132 may be located at a second axial end 134 of rotor 102. In various embodiments, a least a portion of second portion $126_{ROTOR}$ of fluid 126 may flow through shaft 106.

Figure 4:
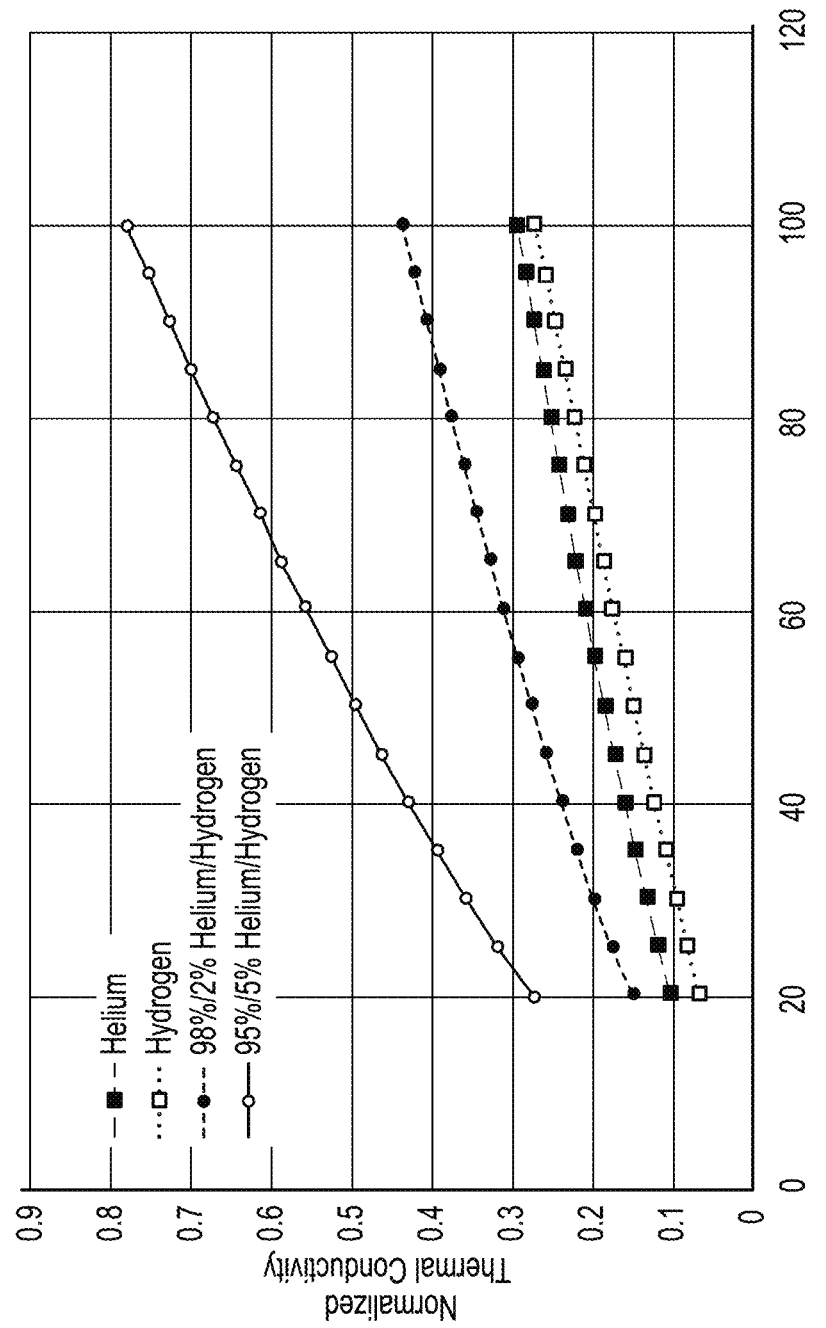
FIG. 4 illustrates a graph comparing the thermal conductivity of various fluids, in accordance with various embodiments.

In accordance with various embodiments, fluid 126 comprises a mixture of helium (He) and hydrogen ($H_2$). Helium forms the majority of the fluid 126, in various embodiments. The mass percentage of hydrogen in the mixture is selected such that the fluid remains non-flammable overall. For example, fluid 126 may contain 10% or less hydrogen with the remaining percentage being formed by helium. All percentage values herein are mass percentages. For example, a fluid 126 consisting of 1% hydrogen and 99% helium, contains 1% by mass hydrogen and 99% by mass helium. In various embodiments, fluid 126 may comprise, or consist, of between about 1% and about 5% hydrogen and between about 99% and about 95% helium. In the previous context only, the term "about" mean±0.1%. In various embodiments, fluid 126 may comprise, or consist, of between about 2% and about 5% hydrogen and between about 98% and about 95% helium. In the previous context only, the term "about" mean±0.1%. In various embodiments, fluid 126 may comprise, or consist, of between about 3% and about 5% hydrogen and between about 97% and about 95% helium. In the previous context only, the term "about" mean±0.1%. In various embodiments, fluid 126 may comprise, or consist, of between about 4% and about 5% hydrogen and between about 96% and about 95% helium. In the previous context only, the term "about" mean±0.1%. In various embodiments, fluid 126 may comprise, or consist, of between about 4.5% and about 5% hydrogen and between about 95.5.% and about 95% helium. In the previous context only, the term "about" mean±0.1%. The addition of hydrogen augments the thermal conductivity of helium in a nonlinear fashion. For example, with reference to FIG. 4, the thermal conductivity of helium, the thermal conductivity of hydrogen, the thermal conductivity of a fluid mixture consisting of 5% hydrogen and 95% helium, and the thermal conductivity of a fluid mixture consisting of 2% hydrogen and 98% helium relative to temperature are illustrated. As illustrated, even at 2% hydrogen, the addition of hydrogen to helium substantially increases the thermal conductivity of the fluid mixture, as compared to either helium or hydrogen alone. As such, including even small fraction of hydrogen with helium increases the heat transfer efficiency of fluid 126 (FIG. 1).

Returning to FIG. 1, in various embodiments, fluid reservoir 122 includes a heat exchanger 136. Heat exchanger 136 is configured to remove a heat load from fluid 126. In various embodiments, fluid 126 may be a supercooled fluid (e.g., a supercooled gas). Heat exchanger 136 and/or fluid reservoir 122 is/are configured to cause the temperature of fluid 126 (e.g., the temperature of the supercooled fluid) to remain between 0K and 40 K, between 10 K and 30K, between 15 K and 25 K, or at about 20 K. As used in the previous context only, the term "about" means±5 K. In various embodiments, heat exchanger 136 may employ a working fluid 138 to remove heat from fluid 126. In various embodiments, working fluid 138 may be a mixture of helium (He) and hydrogen ($H_2$), as described above with reference to fluid 126. In various embodiments, cooling system 120 is configured such that all, or nearly all, of fluid 126 is located in fluid reservoir 122 when machine 100 is not operating (e.g., when no current is being supplied to stator windings 112). In various embodiments, a valve 140 may control the flow/output of fluid 126 from fluid reservoir 122. When machine 100 is not operating valve 140 may be in the closed position. During operation (e.g., in response to current being supplied to stator windings 112), valve 140 may be in the open position.

The increased thermal conductivity of fluid 126 and/or of working fluid 138, as compared to the thermal conductivity of helium alone, allows for decreased temperature differences between fluid 126 and rotor and stator windings 110, 112 and/or between fluid 126 and working fluid 138. For example, a smaller temperature delta between the fluid 126 and rotor and stator windings 110, 112 (i.e., a decreased difference in the temperature of fluid 126 relative to the temperature of rotor windings 110 and/or to the temperature of stator windings 112) can remove the heat load associated with maintaining rotor and stator windings 110, 112 at or below their respective superconductivity transition temperature(s) $T_c$. Removing a greater heat load at a smaller temperature difference increases energy efficiency, which may allow for decreased fluid 126 flow rates, smaller pumps 124, and/or smaller heat exchangers 136, thereby decreasing a footprint and/or weight of machine 100.

Figure 2:
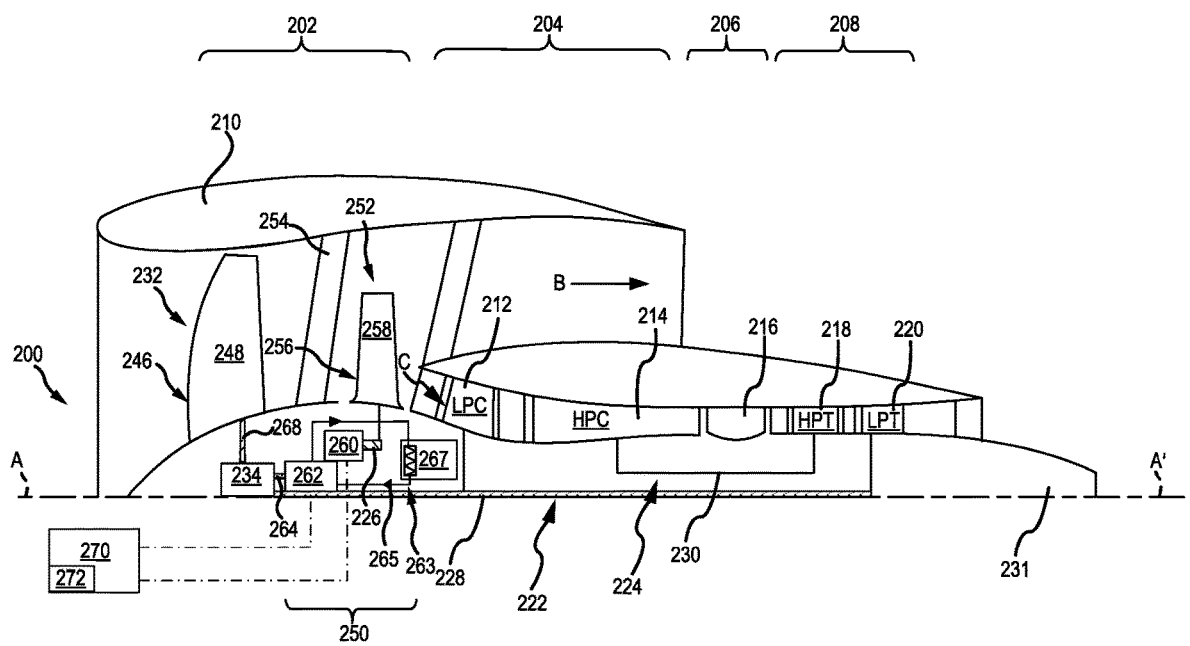
FIG. 2 illustrates a cross-section view of a hybrid turbine engine, in accordance with various embodiments; in accordance with various embodiments.

With reference to FIG. 2, a hybrid turbine engine 200 is provided. As used herein, a "hybrid turbine engine" refers to an engine that employs both electrical current and combustion gases to generate thrust. Hybrid turbine engine 200 may be a two-spool turbofan. In this regard, engine 200 generally incorporates a fan section 202, a compressor section 204, a combustor section 206, and a turbine section 208. In operation, fan section 202 drives fluid (e.g., air) along a bypass flow-path B defined, at least partially, by a nacelle 210, and also along a core flow-path C for compression by a low pressure compressor 212 and a high pressure compressor 214, then communication into a combustor 216, and then expansion through a high pressure turbine 218 and a low pressure turbine a 220.

Hybrid turbine engine 200 may comprise a low speed spool 222 and a high speed spool 224 mounted for rotation about an engine central longitudinal axis A-A'. In various embodiments, hybrid turbine engine 200 may further include an after-fan turbine spool 226 (also referred to as an after-fan turbine shaft) mounted for rotation about engine central longitudinal axis A-A'.

Low speed spool 222 includes a low speed shaft 228 that connects fan 232, low pressure turbine 220, and low pressure compressor 212. Low speed spool 222 may be connected to fan 232 through a gear assembly 234 that can drive fan 232 at a lower speed than low speed spool 222. Gear assembly 234 rotationally couples low speed shaft 228 to fan 232, thereby transferring torque from low speed shaft 228 to fan 232 and providing rotational force to fan 232. High speed spool 224 includes a high speed shaft 230 that connects high pressure compressor 214 and high pressure turbine 218. A rotations per minute (RPM) of high speed shaft 230 is generally greater than an RPM of low speed shaft 228.

Combustor 216 may be located between high pressure compressor 214 and high pressure turbine 218. Combustor 216 is configured to receive a fuel, which is ignited in combustor 216. Fan 232 may include one or more rotor assemblies (stages) 246. Rotor assemblies 246 may each comprise a plurality of blades 248 configured to rotate about engine central longitudinal axis A-A'. In various embodiments, an after-fan system 250 is located at an aft (or outlet) end of fan 232. After-fan system 250 may include an after-fan turbine 252 located aft of an exit guide vane assembly 254.

After-fan turbine 252 includes one or more rotor assemblies (rotor stages) 256. Rotor assemblies 256 each comprise a plurality of blades 258. Blades 258 may each be coupled to a disk, which may be configured to rotate about engine central longitudinal axis A-A'. Fluid output from fan 232 may drive rotation of blades 258, thereby rotating after-fan turbine shaft 226. In various embodiments, after-fan turbine 252 may include multiple stages of rotating blades with one or more stages of stationary vanes axially interspersed between the stages of rotating blades. The flow output by after-fan turbine 252 may be provided to bypass flow-path B and to core flow-path C.

In accordance with various embodiments, after-fan system 250 may include an electrical generator 260 operationally coupled to after-fan turbine 252. Electrical generator 260 is configured to generate current (e.g., alternating current (AC)), in response to rotation of after-fan turbine 252. After-fan turbine shaft 226 of after-fan system 250 connects after-fan turbine 252 and to the input of electrical generator 260. In this regard, after-fan turbine shaft 226 may form a mechanical input of electrical generator 260.

After-fan system 250 further includes an electric motor 262 operationally coupled to electrical generator 260. Electric motor 262 may be configured to generate torque or other mechanical energy in response to an electrical signal (e.g., current) output by electrical generator 260. Electric motor 262 is operationally coupled to fan 232. In accordance with various embodiments, electric motor 262 is configured to transfer torque to fan 232. In various embodiments, electric motor 262 may be rotationally coupled to fan 232 via gear assembly 234. In this regard, electric motor 262 may drive rotation of gear assembly 234, thereby causing rotation of fan 232. In various embodiments, electric motor 262 is mechanically (e.g., rotationally) coupled to gear assembly 234 via a motor shaft 264. Motor shaft 264 rotationally couples the output of electric motor 262 to the input of gear assembly 234. In this regard, motor shaft 264 transfers torque from electric motor 262 to gear assembly 234, thereby causing rotation of fan 232. In various embodiments, an input shaft 268 of fan 232 may be rotationally coupled to, and/or may form an output of, gear assembly 234. In this regard, gear assembly 234 drives rotation of fan input shaft 268 (e.g., gear assembly 234 transfers torque to fan input shaft 268). Rotation of fan input shaft 268 drives rotation of fan 232.

In accordance with various embodiments, after-fan turbine 252 is configured to extract energy from the flow of fluid output by fan 232 and return energy to fan 232 through torque. After-fan turbine shaft 226 transfers torque from after-fan turbine 252 to electrical generator 260. Electrical generator 260 is configured to generate electrical current in response to the torque generated by after-fan turbine 252 and transferred to electrical generator 260 via after-fan turbine shaft 226. In various embodiments, electrical generator 260 may comprise an AC generator with permanent magnet, an AC generator without permanent magnet, an AC self-oscillation rotary generator, or any other generator suitable for generating current in response to rotary motion.

The electrical current output from electrical generator 260 may be provided to electric motor 262. In various embodiments, electric motor 262 comprises a superconducting electric machine, as described above with reference to FIG. 1. With combined reference to FIG. 1 and FIG. 2, a cooling system 263, similar to cooling system 120, provides fluid 265 to the windings of electric motor 262. Fluid 265 is a helium-hydrogen mixture, as described above with reference to fluid 126. In various embodiments, cooling system 263 includes a fluid reservoir 267 similar to fluid reservoir 122. In various embodiments, fluid reservoir 267 is located on, located within, coupled to, or otherwise associated with engine 200. For example, fluid reservoir 267 may be coupled to an engine casing structure and/or located in a tail cone 231 of engine 200. In various embodiments, fluid reservoir 267 may be located on nacelle 210.

In various embodiments, a controller 270 may control the flow of electrical current to electric motor 262. Controller 270 may, for example, be a portion of a flight control computer, a portion of a Full Authority Digital Engine Control (FADEC), a stand-alone controller, or combinations thereof. In accordance with various embodiments, controller 270 may comprise one or more processors configured to implement various logical operations in response to execution of instructions, for example, instructions stored on a non-transitory, tangible, computer-readable medium. The one or more processors can be a general purpose processor, a microprocessor, a microcontroller, a digital signal processor (DSP), an application specific integrated circuit (ASIC), a field programmable gate array (FPGA) or other programmable logic device, discrete gate or transistor logic, discrete hardware components, or any combination thereof. Controller 270 may include a memory 272. Memory 272 may store executable instructions and data to implement control logic of controller 270. Memory 272 may comprise a non-transitory, tangible computer-readable medium having instructions stored thereon that, in response to execution by the controller 270, cause the controller 270 to perform various operations relative to the control of engine 200. For example, instructions for controlling when engine 200 generates thrust via the electric motor 262 and when engine 200 generates thrust via ignition of fuel within combustor 216. The term "non-transitory" is to be understood to remove only propagating transitory signals per se from the claim scope and does not relinquish rights to all standard computer-readable media that are not only propagating transitory signals per se.

In accordance with various embodiments, controller 270 also controls the flow of fuel to combustor 216. In this regard, controller 270 may determine whether combustion gases produced by igniting fuel or electrical current produced by electrical generator 260 generates torque for rotation of fan 232. Stated differently, controller 270 is configured to control whether engine 200 operates as an electric turbine engine, wherein thrust is generated by an electric motor driving rotation of fan, or a gas combustion turbine engine, wherein thrust is generated by igniting fuel to produce combustion gases. For example, if the rpms of after-fan turbine shaft 226 or the current output by electrical generator 260 fall below a threshold level, controller 270 may cause fuel to be injected into and ignited in combustor 216. Similarly, if the rpms of after-fan turbine shaft 226 and/or the current output by electrical generator 260 is equal to or greater than the threshold level, controller 270 may cease injection of fuel into combustor 216. In various embodiments, controller 270 may be configured to inject fuel into combustor 216 based on flight parameters. For example, during start-up, take-off, and climb, controller 270 may cause fuel to be injected into combustor 216. And during cruise and landing, controller 270 may operate engine in electric mode, wherein electric motor 262 drives rotation of fan 232.

Figure 3:
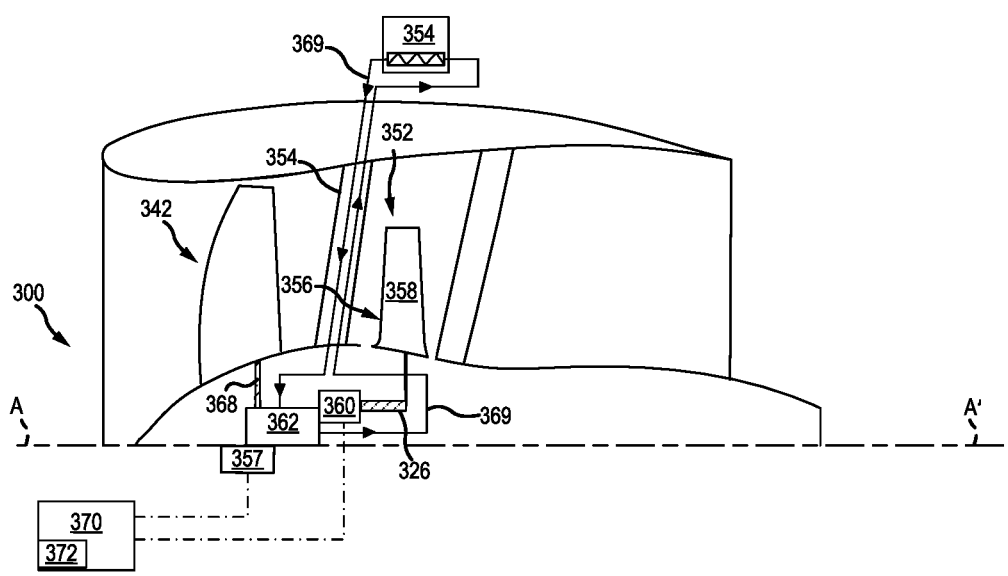
FIG. 3 illustrates a cross-section view of an electric engine, in accordance with various embodiments; in accordance with various embodiments.

With reference to FIG. 3 an electric engine 300 is illustrated. Electric engine 300 may include a fan 342, an exit guide vane assembly 354, and an after-fan turbine 352, similar to after-fan turbine 252 in hybrid engine 200 in FIG. 2. In various embodiments, electric engine 300 is powered solely via electrical energy generated by after-fan turbine 252 and/or one or more batteries 357. In this regard, combustor section 206, compressor section 204, and turbine section 208 of hybrid turbine engine 200 may be eliminated from electric engine 300.

After-fan turbine 252 includes one or more rotor assemblies (rotor stages) 356. Rotor assemblies 356 each comprise a plurality of blades 358. An electrical generator 360 is operationally coupled to after-fan turbine 352. Electrical generator 360 is configured to generate current (e.g., alternating current (AC)), in response to rotation of after-fan turbine 352. After-fan turbine shaft 326 connects after-fan turbine 352 to the input of electrical generator 360. After-fan turbine 352 is configured to extract energy from the flow of fluid output by fan 342 and return energy to fan 342 through torque. In various embodiments, electrical generator 360 may comprise an AC generator with permanent magnet, an AC generator without permanent magnet, an AC self-oscillation rotary generator, or any other generator suitable for generating current in response to rotary motion.

The electrical current output from electrical generator 360 may be provided to electric motor 362. Electric motor 362 may be configured to generate torque or other mechanical energy in response to an electrical signal (e.g., current) received from electrical generator 360 and/or one or more batteries 357. Controller 370, including a comprise a non-transitory, tangible computer-readable medium 372, may control the flow of current to electric motor 362.

Electric motor 362 is rotationally coupled to fan 342. In accordance with various embodiments, electric motor 362 is configured to transfer torque to fan 342. In various embodiments, electric motor 362 is directly coupled to fan 342 via, for example, a motor shaft 368. Motor shaft 368 is rotationally coupled to and/or may form a mechanical output of electric motor 362 and a mechanical input of fan 342. Motor shaft 368 is configured to transfer torque from electric motor 362 to fan 342, thereby causing rotation of fan 342. In various embodiments, electric motor 362 may be rotationally coupled to fan 232 via a gear assembly, similar to gear assembly 234 in FIG. 2. For example, motor shaft 368 may form the mechanical input of the gear assembly, with the mechanical output of the gear assembly forming the mechanical input of fan 342.

In various embodiments, electric motor 362 comprises a superconducting electric machine, as described above with reference to FIG. 1. With combined reference to FIG. 1 and FIG. 3, a cooling system 363, similar to cooling system 120, provides fluid 365 to the rotor and stator windings of electric motor 362. Fluid 365 is a helium-hydrogen mixture, as described above with reference to fluid 126. In various embodiments, cooling system 363 includes a fluid reservoir 367 similar to fluid reservoir 122. In various embodiments, fluid reservoir 367 is apart from electric engine 300. For example, fluid reservoir 367 may be located in a pylon, wing, fuselage, or other aircraft structure. In various embodiments, one or more conduits 369 of cooling system 363 may be located along and/or in exit guide vane assembly 354. Conduits 369 fluidly connect fluid reservoir 367 and electric motor 362. In this regard, fluid 365 is provided to electric motor 362 via conduits 369.

Figure 5:
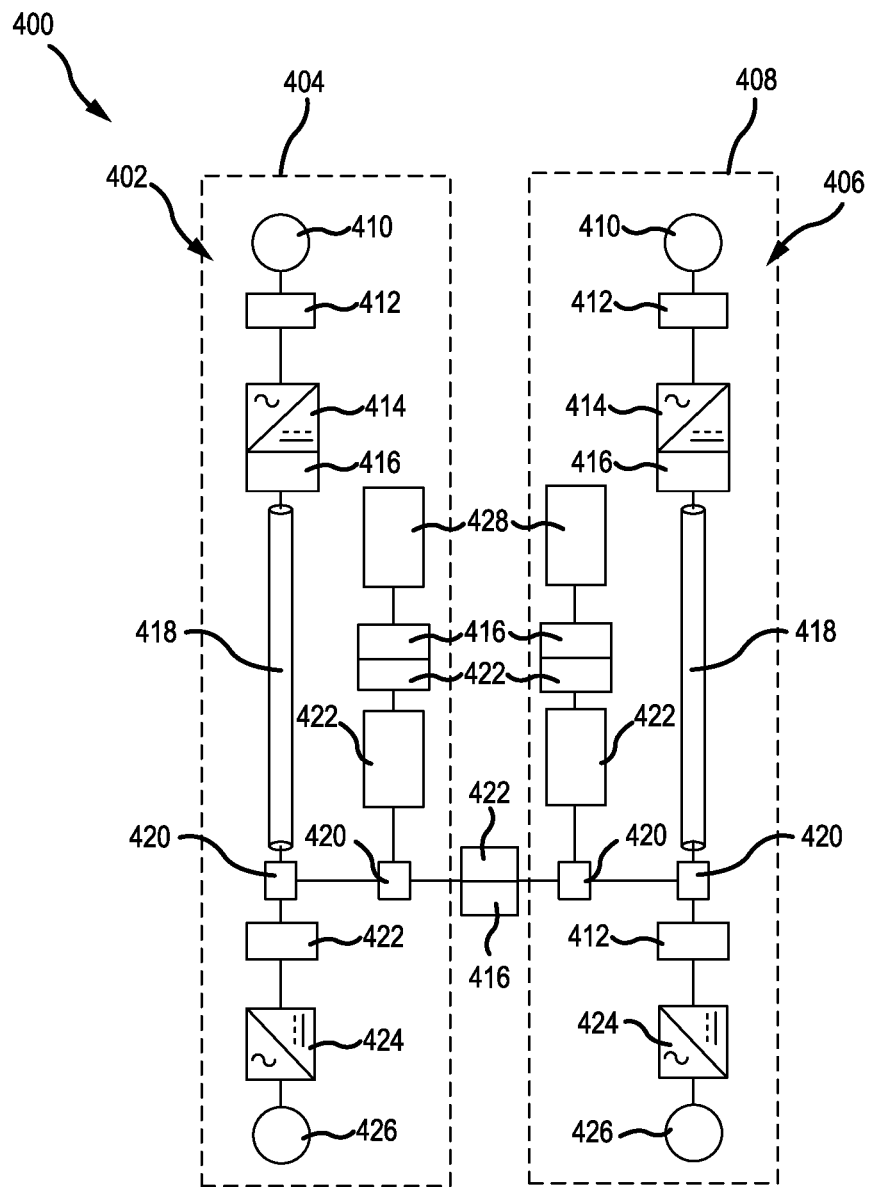
FIG. 5 illustrates a power distribution system for an electrically powered aircraft, in accordance with various embodiments.

While FIGS. 1, 2, and 3 describe superconducting electric machines with reference to electric motors, it is contemplated and understood that other superconducting components may benefit from cooling via a fluid comprising a mixture of hydrogen and helium. In this regard, the present disclosure contemplates thermally coupling any superconducting component to a working fluid comprising a mixture of hydrogen and helium). For example, and with reference to FIG. 5, a power generation system 400 for an electrically powered aircraft is illustrated. Power generation system 400 may include a first system 402 located on a first (e.g., left) wing 404 and a second system 404 located on a second (e.g., right) wing 408. Each of first system 402 and second system 406 includes a generator 410, an alternating current (AC) circuit breaker 412, an AC to direct current (DC) rectifier 414, fault current limiters 416, cables 418, electrical connectors 420, circuit breakers 422, an inverter 424, a motor 426, and an energy storage device 428. In accordance with various embodiments, one or more of motors 426, generators 410, circuit breakers 412, 422, fault current limiters 416, cables 418, and/or connectors 420 may include one or more superconducting component(s). In this regard, one or more superconductor(s) of motors 426 may be cooled with a fluid comprising a helium-hydrogen mixture, as described above with reference to fluid 126. One or more superconductor(s) of generators 410 may be cooled with a fluid comprising a helium-hydrogen mixture, as described above with reference to fluid 126. One or more superconductor(s) of circuit breakers 412, 422 may be cooled with a fluid comprising a helium-hydrogen mixture, as described above with reference to fluid 126. One or more superconductor(s) of cables 418 may be cooled with a fluid comprising a helium-hydrogen mixture, as described above with reference to fluid 126. One or more superconductor(s) of connectors 420 may be cooled with a fluid comprising a helium-hydrogen mixture, as described above with reference to fluid 126.

Figure 6:
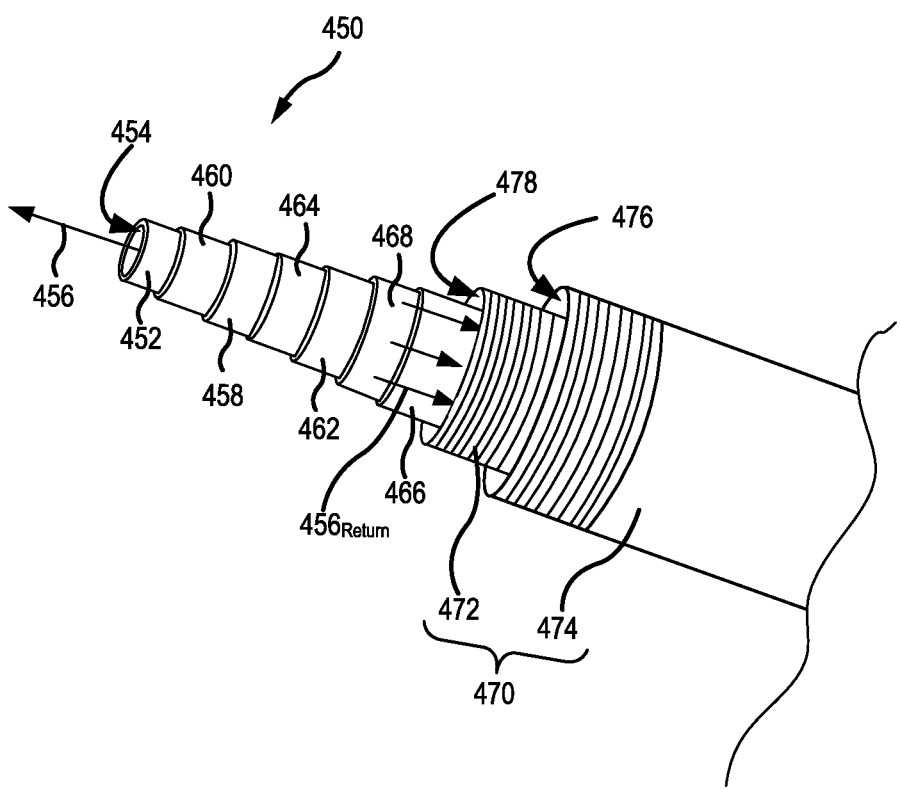
FIG. 6 illustrates coolant flow through a superconducting component, in accordance with various embodiments.

With reference to FIG. 6, a superconductor component 450 is illustrated, in accordance with various embodiment. Superconductor component 450 may be a superconductor cable, such as cable 418 in FIG. 5. Superconductor cable may be used to electrically connect (e.g., electrically couple) a first electrical component to a second electrical component.

Superconductor component 450 includes a first superconductor layer 452. First superconductor layer 452 may define a fluid channel 454 through which fluid 456 flows. Fluid 456 is a helium-hydrogen mixture, as described above with reference to fluid 126. A second superconductor layer 458 may be located around (e.g., radially outward of) first superconductor layer 452. A first insulating layer 460 may be located between first superconductor layer 452 and second superconductor layer 458. A third superconductor layer 462 may be located around (e.g., radially outward of) second superconductor layer 458. A second insulating layer 464 may be located between second superconductor layer 458 and third superconductor layer 462. A shielding layer 466 may be located are (e.g., radially outward of) third superconductor layer 462. Shielding layer 466 is configured to shield and/or block electromagnetic radiation. In this regard, the material of shielding layer 466 may be any material (e.g., copper, brass, nickel, silver, steel, tin, etc.) capable of blocking electromagnetic radiation. A third insulating layer 468 may be located between third superconductor layer 462 and shielding layer 466.

In accordance with various embodiments, first superconductor layer 452, second superconductor layer 458, and third superconductor layer 462 are each formed of a superconducting material. The superconducting material of first, second, and third superconductor layers 452, 458, 462 may have a superconducting transition temperature $T_c$ of 40 K or less (e.g. a superconducting transition temperature $T_c$ of between 0 K and 40 K). In various embodiments, the superconducting material of first, second, and third superconductor layers 452, 458, 462 may have a superconducting transition temperature $T_c$ of 30 K or less (e.g. a material having a superconducting transition temperature $T_c$ of between 0 K and 30 K). In various embodiments, first, second, and third superconductor layers 452, 458, 462 may be formed of magnesium diboride.

First insulating layer 460, second insulating layer 464, and third insulating layer 468 may be formed from a polyimide material, such poly-oxydiphenylene-pyromellitimide. A suitable insulating material for first insulating layer 460, second insulating layer 464, and third insulating layer 468 is available under the trade name KAPTON® from DuPont Corporation, Del., U.S.A.

A cryostat casing 470 may be locating around (e.g., radially outward of) shielding layer 466. Cryostat casing 470 may be a double-wall vacuum insulated cylinder. In this regard, cryostat casing 470 includes an inner layer 472 and an outer layer 474. Inner layer 472 is radially inward of outer layer 474 and/or is located closer to shielding layer 466 as compared to outer layer 474. A volume 476 is located between inner layer 472 and outer layer 474. Stated differently, inner layer 472 and outer layer 474 define volume 476. In accordance with various embodiments, volume 476 is devoid of material (e.g., devoid of air) such that a vacuum is created between inner layer 472 and an outer layer 474. Inner and outer layers 472, 474 may be formed of any suitable material for forming a vacuum layer therebetween. For example, inner and outer layers 472, 474 may be aluminum, stainless steel, titanium, etc.) Cryostat casing 470 provides thermal insulation between the environmental temperatures outside superconductor component 450 and the cryogenic temperatures within superconductor component 450.

In various embodiments, a second fluid channel 478 may be located between shielding layer 466 and inner layer 472 of cryostat casing 470. Stated differently, shielding layer 466 and inner layer 472 may define second fluid channel 478. In various embodiments, second fluid channel 478 may be a "return" fluid channel. In this regard, fluid 456 may flow from a fluid reservoir, such as fluid reservoir 122 in FIG. 1, through fluid channel 454 in a first direction, and may return to the fluid reservoir by flowing through second fluid channel 478 in a second direction, opposite the first direction.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods, and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A cooling system for a superconducting electric machine, comprising:
   a fluid reservoir;
   a first fluid comprising a first mixture of hydrogen and helium configured to be stored in the fluid reservoir; and
   a plurality of conduits fluidly coupled to the fluid reservoir and forming a closed loop between the fluid reservoir and the superconducting electric machine,
   wherein the closed loop is configured to:
      provide a first portion of the first fluid to a stator comprising a stator winding such that the first portion of the first fluid removes a first heat load from the stator winding, and
      provide a second portion of the first fluid to a rotor comprising a rotor winding such that the second portion of the first fluid removes a second heat load from the rotor winding.

2. The cooling system of claim 1, wherein the first mixture of hydrogen and helium comprises between about 2% and about 5% hydrogen and between about 98% and about 95% helium.

3. The cooling system of claim 2, wherein the fluid reservoir comprises a cryogenic cooler.

4. The cooling system of claim 1, wherein the first mixture of hydrogen and helium comprises between about 0.5% and about 10% hydrogen and between about 99.5% and about 90% helium.

5. The cooling system of claim 1, wherein the fluid reservoir includes a heat exchanger comprising a working fluid configured to remove a heat load from the first fluid, and wherein the working fluid comprises a second mixture of hydrogen and helium, and wherein the second mixture of hydrogen and helium comprises between about 2% and about 5% hydrogen and between about 98% and about 95% helium.

6. The cooling system of claim 1, wherein at least one of the stator winding or the rotor winding is formed of a superconducting material having a superconducting transition temperature between 0 Kelvin and 40 Kelvin.

7. The cooling system of claim 6, wherein the least one of the stator winding or the rotor winding comprises magnesium diboride.

8. A superconducting electric machine, comprising:
a rotor configured to rotate about a central longitudinal axis;
a stator configured to be non-rotating relative to the central longitudinal axis;
a rotor winding coiled about the rotor and comprising a first superconducting material;
a stator winding coiled about the stator and comprising a second superconducting material; and
a cooling system configured to thermally couple a first fluid to the stator winding and the rotor winding, the first fluid comprising a non-flammable mixture of hydrogen and helium,
wherein the cooling system is configured to:
provide a first portion of the first fluid to the stator winding such that the first portion of the first fluid removes a first heat load from the stator winding, and
provide a second portion of the first fluid to the rotor winding such that the second portion of the first fluid removes a second heat load from a rotor winding.

9. The superconducting electric machine of claim 8, wherein the non-flammable mixture of hydrogen and helium comprises between about 2% and about 5% hydrogen and between about 98% and about 95% helium.

10. The superconducting electric machine of claim 8, wherein the cooling system further comprises:
a fluid reservoir configured to house the non-flammable mixture of hydrogen and helium; and
a plurality of conduits fluidly coupling to the fluid reservoir to the rotor and the stator.

11. The superconducting electric machine of claim 10, wherein the fluid reservoir includes a heat exchanger comprising a working fluid configured to remove a heat load from the first fluid, and wherein the working fluid comprises the non-flammable mixture of hydrogen and helium.

12. The superconducting electric machine of claim 8, wherein at least one of the stator winding or the rotor winding is formed of a superconducting material having a superconducting transition temperature of 40 Kelvin or less.

13. An aircraft engine, comprising:
a fan;
an exit guide vane located at an outlet of the fan;
an after-fan turbine located aft of the exit guide vane;
an electrical generator operably coupled to the after-fan turbine and configured to generate an electrical current in response to rotation of the after-fan turbine;
an electric motor electrically coupled to the electrical generator and rotationally coupled to the fan, the electric motor including a superconductor; and
a cooling system configured to thermally couple a supercooled fluid to the superconductor.

14. The aircraft engine of claim 13, wherein the electric motor comprises
a rotor configured to rotate about a central longitudinal axis;
a stator configured to be non-rotating relative to the central longitudinal axis;
a rotor winding coiled about the rotor; and
a stator winding coiled about the stator, wherein at least one of the rotor winding or the stator winding comprises the superconductor.

15. The aircraft engine of claim 14, wherein the cooling system is configured such that a first portion of the supercooled fluid removes a first heat load from the stator winding and a second portion of the supercooled fluid removes a second heat load from the rotor winding.

16. The aircraft engine of claim 15, further comprising:
a compressor section aft of the after-fan turbine;
a combustor section configured to receive a compressed fluid from the compressor section; and
a turbine section aft of the combustor section.

17. The aircraft engine of claim 16, further comprising a controller configured to control a current provided to the electric motor and a flow of fuel to the combustor section, wherein the controller is configured to determine whether to operate the aircraft engine as an electric engine or a gas combustion engine based on at least one of a rotations per minute of the after-fan turbine or a current output by the electrical generator.

18. The aircraft engine of claim 17, wherein the supercooled fluid comprises between about 0.5% and about 10% hydrogen and between about 99.5% and about 90% helium.

* * * * *